May 24, 1927.
J. KRAMER ET AL
1,629,511
MACHINE FOR MANUFACTURING CORRUGATED BOARD
Filed Nov. 17, 1923 3 Sheets-Sheet 1
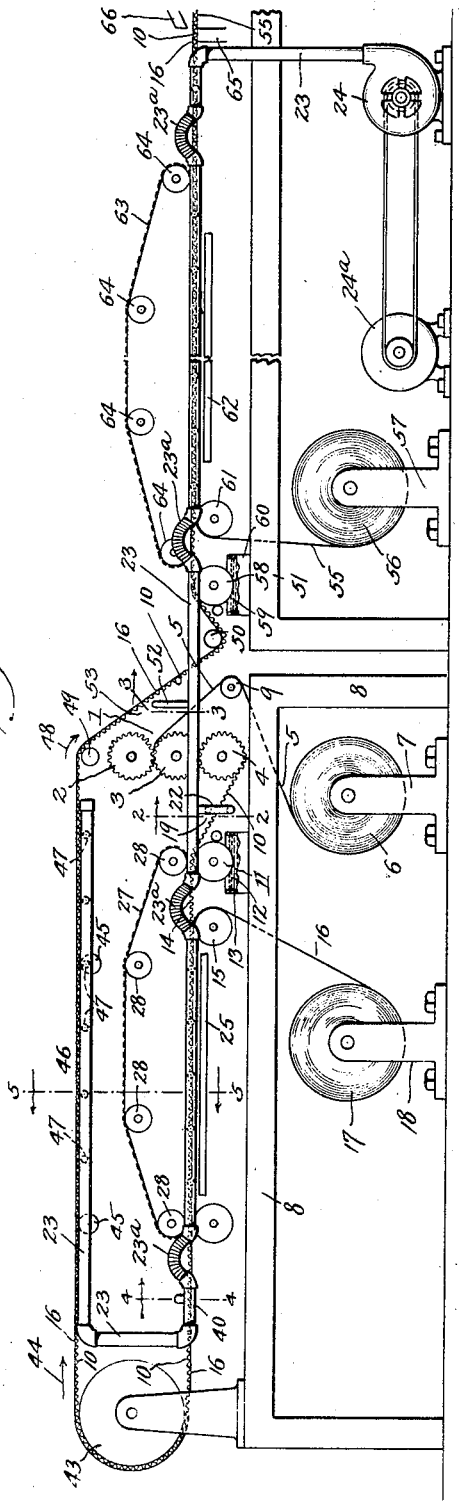
INVENTORS,
Joseph Kramer and
Albert H. Israel
By Henry J. Lucke
ATTORNEY.

May 24, 1927.

J. KRAMER ET AL

MACHINE FOR MANUFACTURING CORRUGATED BOARD

Filed Nov. 17, 1923 3 Sheets-Sheet 2

1,629,511

WITNESSES
Oliver W. Holmes

INVENTORS,
Joseph Kramer and
Albert H. Israel,
By Henry J. Locke
ATTORNEY.

May 24, 1927.
J. KRAMER ET AL
1,629,511
MACHINE FOR MANUFACTURING CORRUGATED BOARD
Filed Nov. 17, 1923   3 Sheets-Sheet 3
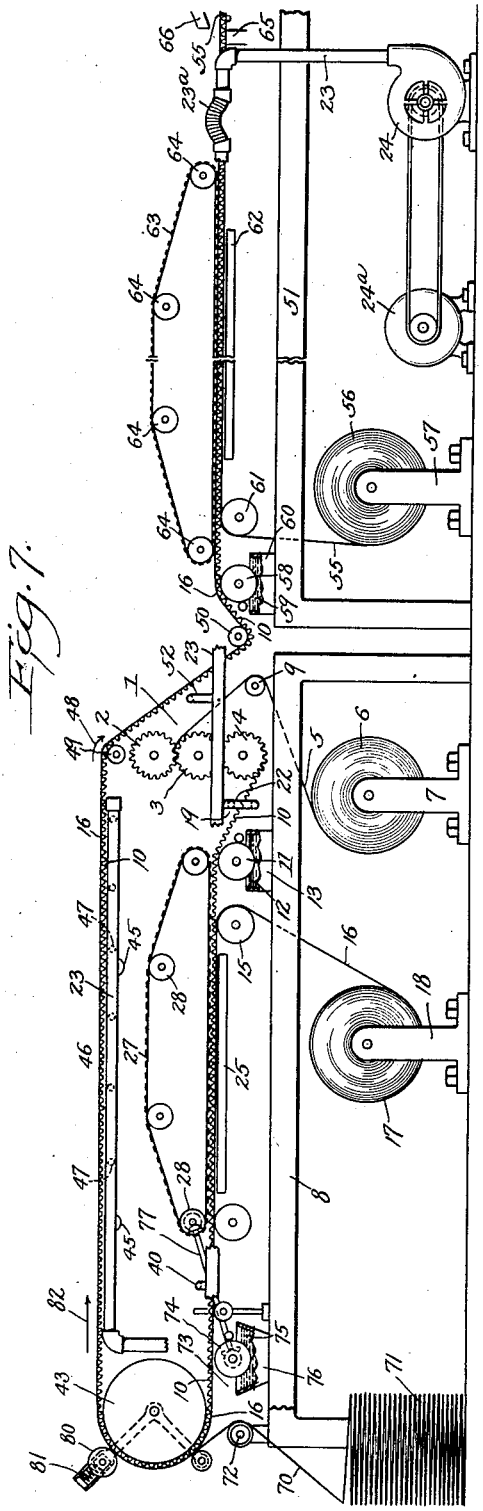
INVENTORS,
Joseph Kramer
and Albert H. Israel,
By Henry J. Lucke,
ATTORNEY.

Patented May 24, 1927.

1,629,511

UNITED STATES PATENT OFFICE.

JOSEPH KRAMER AND ALBERT H. ISRAEL, OF NEW YORK, N. Y.

MACHINE FOR MANUFACTURING CORRUGATED BOARD.

Application filed November 17, 1923. Serial No. 675,288.

This invention relates to improvements in the method of and means for manufacturing corrugated board.

Heretofore, it has been customary in manufacturing double face corrugated board in a so-called corrugating machine to feed straw board or equivalent into the intermeshing corrugating rolls, then applying a smooth face ply or liner on each of the opposite sides of the corrugated ply while interposing an adhesive such as silicate of soda or the like, and then subjecting the composite material to elevated temperature for the purpose of drying the adhesive to bond the plies to one another.

However, in such manufacture, the two liners are separately applied to the corrugated ply and the delivery of the resulting composite material is limited by the speed of travel through the two temperature stages of the machine. Efforts to attain an increased output by increasing the degree of the temperature of the drying stage have not been successful owing to the result of "steaming" the straw board, and consequent deterioration of the qualities of the product.

It has also been proposed to increase the extent of travel of the composite board through the heating stages by enlarging the respective heating units, but such procedure has not been commercially successful for the reason that the inner ply of corrugated straw board, as well as the outer liners, are thereby overheated and materially decreased in stiffness and permanence and thereby render the product of inferior quality. Such procedure is also disadvantageous in that the dimension of the machine is greatly enlarged, entailing greater initial cost of the machine and increased floorspace in the use of the machine.

In such prior art manufacture, it is an accepted practice to pile the cut lengths of the finished corrugated product on one another before delivery to the cross-creasing or scoring machine, or other subsequent necessary operation for the making of boxes, cartons or the like. We have discovered that such practice does not bring about any substantial drying-out of the board, and that moisture is retained to a high degree notwithstanding the lowering of temperature and effects a reduced grade of product. We have also observed that the piling up method results in crushing or deforming the corrugations of the corrugated ply by reason of the retained moisture.

Pursuant to the present invention, the drying-out of the respective liners and corrugated ply and the bonding of the adhesive is effected at the respective stages in the manufacture by the use of currents of air directed against the surfaces of the plies at the desired locations in coaction with a relatively short period of heating, whereby a highly improved product of the composite material is obtained and the effects due to overheating and "steaming" are entirely obviated. Our invention effects the drying-out of the plies in the forming of the composite board in the transit of the plies through the machine. Preferably, the air for the drying-out operations is pre-heated, and thereby lowering the temperature of the heating members of the machine and enhancing the speed of travel of the product and consequent increase of output.

Our invention also enables the lengths of the heating members to be decreased and thereby greatly decreasing the required floorspace and as well the cost of installation and attendant advantages.

Further features and objects of the invention will be more fully understood from the following detail description and the accompanying drawings, in which Fig. 1 is a side elevation of a machine shown largely in diagrammatic form and illustrating the use of our invention;

Fig. 2 is a sectional elevation, on an enlarged scale, on line 2—2 of Fig. 1;

Fig. 3 is a sectional elevation, on an enlarged scale, on line 3—3 in Fig. 1;

Fig. 4 is a sectional elevation on an enlarged scale, on line 4—4 of Fig. 1;

Fig. 7 is a side elevation, largely diagrammatic, showing a corrugated machine employing asphalt as an adhesive and a layer of burlap applied to a liner;

Fig. 8 is a side elevation, similar to Fig. 7, but showing a modification; and

Fig. 9 is a detail enlarged elevation of a spreader roll for the burlap ply shown in Figs. 7 and 8.

Figure 5:
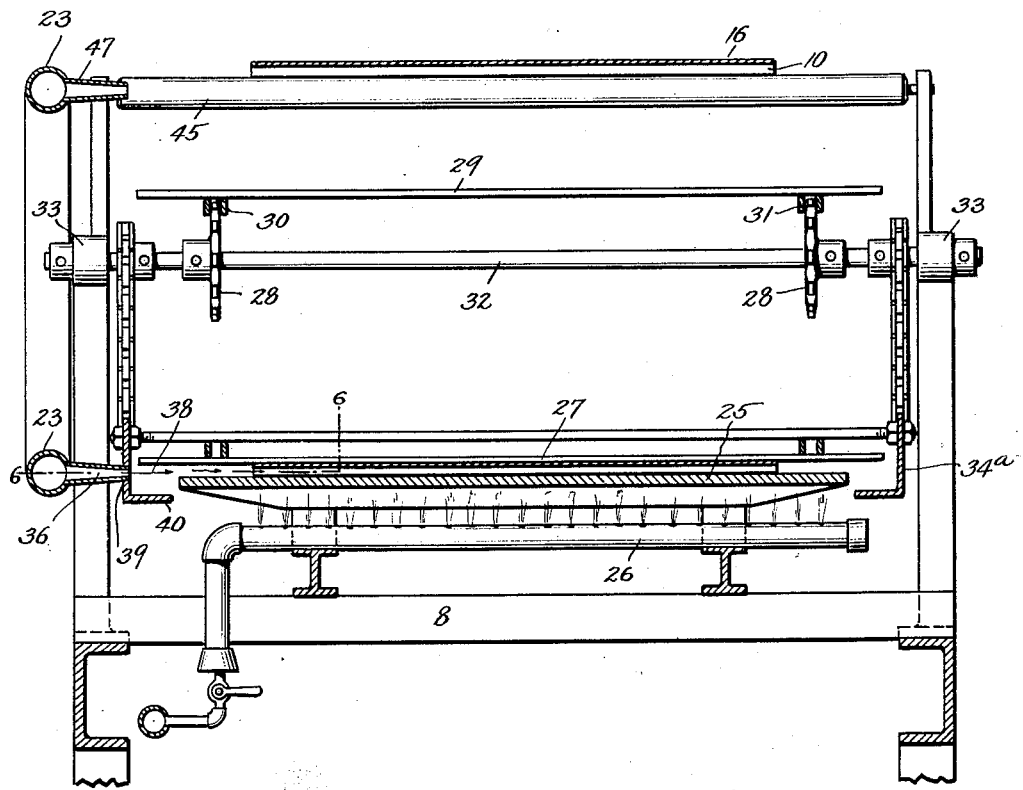
Fig. 5 is a sectional elevation on line 5—5 of Fig. 1, on a greatly enlarged scale.

Referring to the drawings, the machine illustrated diagrammatically corresponds generally to a corrugating machine of an approved type, but only in so far as relates to the relative disposition of the mechanisms generally for forming the corrugated ply, the application of a plain ply or liner on one face thereof and the subsequent application of a plain ply or liner on the opposite face thereof.

The corrugating mechanism is indicated at 1 and comprises the usual set of three intermeshing, heated corrugating rolls, 2, 3, 4 to which the ply 5 of strawboard is fed from a supply roll 6, usually removably mounted on the brackets 7, disposed below but in fixed relation to the bed 8 of the machine. In advance of such corrugating operation, the strawboard 5 is subjected to steam emitted through the slitted fixed tube 9 to impregnate the strawboard and render the material pliable.

The resulting corrugated ply 10, see Fig. 1, is passed over the roll 11, the lower face of which dips into the bath 12 of silicate of soda or like adhesive in the tank 13, whereby silicate of soda or other suitable adhesive is applied on the crowns of the corrugations by contact with the face of the roll 11.

The resulting adhesively coated corrugated ply 14 is then fed over the guide roll 15, over which is also fed the outer ply or liner 16, from a suitable supply roll 17, mounted in the brackets 18, similar to the brackets 7, and whereby the ply 16 is fed in contact with the crowns of the corrugated board 10 to which the adhesive has been previously applied, whereafter both the outer liner 16 and corrugated ply 10 are fed to the heating unit, as described more fully hereinafter.

In advance of the adhesive unit 11, 12, as at the location 19, see Figs. 1 and 2, the corrugated ply 10 is subjected to a current of compressed air, preferably preheated. As one such provision of means, see Fig. 2, we locate the nozzle 20 directed on the lower face of the corrugated ply 10 and the nozzle 21 directed on the upper face of the ply 10. Such nozzles 20, 21 may be connected to a common branch pipe 22, tapped from the supply pipe 23, leading from a compressor 24, blower or the like, driven by an electric or other motor 24ª. As will be described more fully hereinafter, the supply pipe 23, may be arranged to supply in common a number of nozzles at the respective locations of application of the discharge of compressed air.

The discharge of the compressed air blasts at the location 19, attains several advantages, including the withdrawal of water or other aqueous content from the respective corrugated faces of the strawboard, thereby rendering the body of the strawboard relatively stiff and also attaining a drying-out of the face of the crowns to which the adhesive is about to be applied by the adhesive roll 11. Such drying-out action insures the retaining of the silicate of soda adhesive at the locations, i. e. the crowns engaged by the adhesive roll 11 and without dispersion of the adhesive into the interior of the strawboard of the corrugated ply. We have discovered that such provision of means enables the adhesive to be maintained within the range of proportion of water or other evaporated solvent and secures definite bonding, by adhesion to the liner in the subsequent heating and pressure stage.

As indicated hereinabove, the adhesive coated corrugated ply 10 and the outer liner 16 are passed jointly over the roll 15, and fed to the heating unit comprising the table or bed 25, heated by suitable heating means 26, see Fig. 5, such as a gas burner, circulating heated oil, steam or the like, and the liner 16 and corrugated ply 14 are subjected to pressure on the face of the heating table 25 in sliding engagement therewith by the endless apron 27 passing over the drive and guide pulleys 28. Such endless apron 27 may be of any approved construction, and usually comprises a series of flat bars 29, arranged laterally edge to edge and each respectively mounted at its opposite ends on the link chains 30, 31, in which instance, the rolls 28 are sets of sprocket wheels and mounted on a common shaft 32 in suitable end bearings 33, 33. The table 25 is mounted in any suitable manner on the bed 8 of the machine. The lower lead of the endless apron 27 is arranged to be raised by a pair of chains and carrier angle 34ª, at the opposite sides of the apron 27, to permit the face of the heating table 25 to be cleaned.

In the transit of the corrugated ply and the liner over the heating table 25, the same are subjected to currents of compressed air, preferably pre-heated, and at spaced locations, whereby the concentration of the adhesive to its bonding constituency is accelerated and the bonding of the liner to the corrugated ply effected while the materials thereof are stiff.

Figure 6:
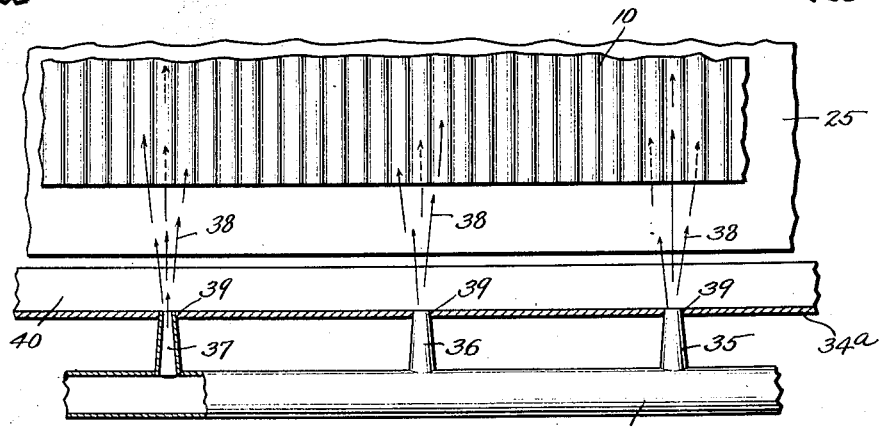
Fig. 6 is a sectional elevation on line 6—6 of Fig. 5.

To effect such result, we provide the nozzles 35, 36, 37, see Figs. 5 and 6, supplied with compressed air by the pipe 23, or equivalent. Such nozzles 35, 36, 37 are preferably located in substantial alignment with the face of the heating table 25, to direct the compressed air in directions, see arrows 38, Figs. 5 and 6, substantially parallel to the lengths of the clearances between the respective corrugations and the outer ply.

For convenience of mounting, the nozzles 35, 36, 37 may project through suitable openings 39 in the carrier angle 34ª.

The corrugated ply and outer liner, upon being bonded, as above described, pass, see 40, within the path of discharge of the compressed air directed from the nozzle 41, see Fig. 4, fed from the pipe 23 as aforesaid or by other suitable means, whereby the currents of air indicated by the arrows 42 further reduce the temperature of the joint corrugated and liner plies and abstract therefrom any further residue of moisture prior to contact of the corrugated ply 14 with return idler roller 43, see Fig. 1.

The return travel, see arrow 44, Fig. 1, may be at the top of the machine and over a series of spaced rollers 45, or equivalent, see also Fig. 5, and the joint plies 10, 16 are preferably subjected to additional air currents at a location, see 46, above the heating table 25. Such arrangement is advantageous in that the atmosphere above the heating table is elevated and convenience is attained in locating the nozzles 47, similar to and in adjacent relation to the nozzles 35, 36, 37. Additional nozzles 47 may be located, as indicated in Fig. 1.

The joint corrugated ply 10 and liner 16 proceed, see arrow 48, Fig. 1, over the idler roll 49, then downwardly to the idler roll 50, suitably mounted on the bed 51 of the second unit of the machine, similarly as in prior machines. However, the nozzle 52, at the location 53, see Figs. 1 and 3, directs currents of air on the joint plies 10, 16, and preferably on the under face thereof.

In the second unit of the machine, the opposite liner 55 is supplied from the roll 56, mounted on the brackets 57, similarly as hereinabove described. The adhesive roll 58 feeds the adhesive 59, such as silicate of soda from the tank 60, to the crowns of the corrugated ply 10, from whence the plies 10, 16, proceed over the roll 61, jointly with the liner 55, thence over the heating table 62, heated similarly as the heating table 25, aforesaid, and provided with air nozzles similar to the aforesaid nozzles 35, 36, 37.

The pressure apron 63 mounted on the rollers 64 is similar to the aforesaid pressure apron 27.

The completed composite board, comprising the inner corrugated ply 10 and the outer liners 16, 55 is cut in any suitable manner, as by the fixed shearing edge 65 and the movable shearing edge 66, the latter being usually operated automatically for a set length of cutting, as heretofore. The cut lengths are piled on one another at the delivery end of the machine.

The completed product at the terminus of the machine, we have discovered, is cool and substantially freed from moisture and the bonding of both plies to the corrugated ply attained to a maximum degree. Our invention also results in a composite product in which the inner or corrugated ply is stiffened and of uniform effective thickness of corrugation and may be fed directly to the scoring or cross-creasing machines for preparation of the cut blanks into cartons or boxes.

Our invention is also applicable for forming corrugated board comprising a ply of burlap.

In Fig. 7, the corrugated unit 1, and the adhesive unit 11, 12 as well as the heat and pressure unit 25, 27, and the air ejecting units 19, 40, correspond to the similar parts shown in the preceding figures and like elements are identified by like reference numbers. The burlap 70 may be fed from a bale 71, or other suitably supply, thence about the roller 72 and into contact with the liner 16. To secure bonding, the adhesive unit 73, comprising the adhesive roll 74 immersed in the bath 75 of adhesive in the tank 76. As indicated, the roll 74 may be driven from a roll 28 of the endless pressure belt 27, as by the indicated gearing 77.

The roll 72 is preferably of a spreading character such as indicated in Fig. 9, and may comprise the reverse threading 78, 79, whereby upon rotation on the roll 72, the burlap in engagement with the exposed opposite threads 78, 79 is stretched laterally and rendered taut while being applied to the adhesive coating on the under facing of the under liner 16. The roll 72 is preferably positively driven by any suitable gearing, as will be understood by those skilled in the art.

A pressure roll 80, under tension of the spring 81, or equivalent serves to hold the ply 70 of burlap in intimate contact with the adhesive on the outer face of the liner 16. The roll 43 is preferably of large diameter and may be heated by steam or like heating medium.

The corrugated ply 10, the liner 16 and the outer burlap ply 70 are thence passed, see arrow 82, Fig. 7, over the top of the first unit 8 to reverse the positions of the previously applied plies and led to the second unit 51. The opposite liner 55, is applied to the opposite face, now the under face of the corrugated ply 10, similarly as herein above described, whereafter the completed board having a ply of burlap on one face is cut by means of the cutting unit 65, 66.

The adhesive for applying burlap to a liner of the composite board is preferably asphalt, and with such asphalt adhesive the ejected air need not be heated and may be cooled to facilitate congealing of the asphalt to its stage of bonding.

In Fig. 8, we have illustrated suitable mechanism for applying burlap at a later stage of the machine, such as the location 90, see Fig. 8. The burlap 91, from a bale 92 or like supply, is passed over the spreader roller 93, corresponding to the aforesaid spreader roll 72, see Fig. 9, thence under the guide roll 94, and in contact with the outer face of the under liner 55, on which has been previously applied a suitable adhesive, such as asphalt or the like, by the applying roll 74 of the adhesive unit 95 corresponding to the aforesaid adhesive unit 73. The pressure is effected by means of the set of co-acting pressure rolls 96, 97, the roll 96 of which may under upward pressure by means of its springs 98, acting at the opposite ends of the shaft of roll 96. The sets of nozzles 99, 100 are located similar to the aforesaid nozzles 20, 21 for the purpose of congealing the adhesive.

By reason of the burlap 91 serving as an under ply of the finished composite board as it attains the delivery end of the machine, it is preferable to locate the movable knife blade 66 on the under side of the stationary knife blade 65, whereby the relatively tough ply of burlap is severed in advance of the severing of the corrugated strawboard and jute liner.

Pursuant to the aforesaid procedure the utilization of the flow of air at the above noted locations, and correspondingly at other desired locations, moisture is effectually removed from the inner corrugated ply of strawboard or the like and from the adhesive, whereby the crystallization of silicate of soda or the reducing of other adhesive to its bonding stage, is facilitated and the bonding secured while the inner and outer layers are in relatively stiff condition. By our procedure, the temperature to which the inner and outer plies are effectively raised, is materially less than that required in heretofore practices, and thereby the length of the heating unit along the path of travel of the plies in the machine may be greatly reduced and a superior product obtained at the delivery end of the machine.

The product of the machine upon attaining the delivery end is substantially free from undue content of moisture and does not require piling or stacking for cooling or other purpose, and may be delivered directly to the cross-creasing machine or scoring machine, for the making of cartons, shipping boxes or other containers.

From the above it will be perceived that the cost of manufacture of corrugated board is greatly reduced by the advantageous factors of reduced size of the machine, including lower initial investment and decrease of necessary floor space, the factor of immediate delivery from the corrugating machine to the finishing machines and the absence of the heretofore required necessary storage space for cooling or supposed drying out.

In such types of corrugating machines wherein a scoring or cross-creasing unit is incorporated, and wherein there has been heretofore required a length of travel for the cooling stage in advance of the scoring or cross-creasing unit, our invention obviates the need of such additional length of travel at such cooling stage and enables the finished board to be directly fed to the scoring or cross-creasing unit on the corrugating machine.

By reason of the absence of excessive moisture in the finished board, the creases applied to the board by the cross-creasing or scoring machine are retained immediately upon completion of the board, thereby facilitating the subsequent formation of the cartons, boxes or like containers.

The discharge of air as above described may be effected by a slit opening in lieu of one or more nozzles, said slit extending the length of the path over which the air currents are desired to be directed.

The product derived by our method is far superior in bonding relation between the plies, in uniformity of full height of corrugation of the inner ply and the absence of deformation of the corrugated ply.

As indicated hereinabove, it is advantageous to employ a common pipe line for connection with the respective nozzles in the use of compressed air for directing the air currents relative to the corrugated ply and the liner, as more particularly described hereinabove. If desired, in lieu of a pump or fan to create compression of the directed air currents, an exhaust fan or equivalent may be employed to thereby create currents of air by suction and thus withdraw the moisture laden air through the common pipe line; in the latter instance, the moisture may be removed by suitable condensing means, as will be understood by those skilled in the art.

In the use of a common pipe line, such as is indicated in the drawings by 23, flexible connections 23ª, are employed as at the respective heating tables 25, 62, to permit the section of pipe carrying the nozzles at the respective heating tables 25, 62, to be elevated jointly with the raising of the pressure belts 27, 63, respectively.

Whereas we have described our invention by reference to specific forms thereof, it will be understood that many changes and modifications may be made without departing from the spirit of the invention.

We claim:

1. In the manufacture of composite corrugated board, means to corrugate a sheet of moistened material, means to direct a current of drying air on to the moist corrugated sheet, means to apply an adhesive to the crowns of the thus dried corrugations, means to apply a plain sheet of material to the adhesive coated crowns, and means to direct a current of drying air through the channels formed by the corrugations.

2. In the manufacture of composite corrugated board, means to corrugate a sheet of moistened material, means to direct a current of drying air on to both sides of the moist corrugated sheet, means to apply an adhesive to the crowns of the thus dried corrugations, means to apply a plain sheet of material to the adhesive coated crowns, and means to direct a current of drying air through the channels formed by the corrugations.

3. In the manufacture of composite corrugated board, means to corrugate a sheet of moistened material, means to direct a current of drying air on to the moist corrugated sheet, means to apply an adhesive to the crowns of the thus dried corrugations, means to apply a plain sheet of material to the adhesive coated crowns, means to direct a current of drying air through the channels formed by the corrugations, means to apply an adhesive to the crowns of the corrugations opposite the applied plain sheet, means to apply a plain sheet of material to the last mentioned adhesive coated crowns, and means to direct a current of drying air through the channels defined by both plain sheets.

4. In the manufacture of composite corrugated board, means to corrugate a sheet of moistened material, means to direct a current of drying air on to both sides of the moist corrugated sheet, means to apply an adhesive to the crowns of the thus dried corrugations, means to apply a plain sheet of material to the adhesive coated crowns, means to direct a current of drying air through the channels formed by the corrugations, means to apply an adhesive to the crowns of the corrugations opposite the applied plain sheet, means to apply a plain sheet of material to the last mentioned adhesive coated crowns, and means to direct a current of drying air through the channels defined by both plain sheets.

5. In the manufacture of composite corrugated board, means to corrugate a sheet of moistened material, means to direct a current of drying air on to the moist corrugated sheet, means to apply an adhesive to the crowns of the thus dried corrugations, means to apply a plain sheet of material to the adhesive coated crowns, means to direct a current of drying air through the channels formed by the corrugations, means to apply a fabric to the plain sheet, and means to direct a current of drying air on to the applied fabric.

6. In the manufacture of composite corrugated board, means to corrugate a sheet of moistened material, means to direct a current of drying air on to the moist corrugated sheet, means to apply an adhesive to the crowns of the thus dried corrugations, means to apply a plain sheet of material to the adhesive coated crowns, means to direct a current of drying air through the channels formed by the corrugations, means to apply fabric to the plain sheet, means to direct a current of drying air on to the applied fabric, means to apply an adhesive to the crowns of the corrugations opposite the applied sheets, means to apply a plain sheet of material to the last mentioned adhesive coated crowns, and means to direct a current of drying air through the channels defined by opposed plain sheets.

7. In the manufacture of composite corrugated board, means to corrugate a sheet of moistened material, means to direct a current of drying air on to the moist corrugated sheet, means to apply an adhesive to the crowns of the thus dried corrugations, means to apply a plain sheet of material to the adhesive coated crowns, means to direct a current of drying air through the channels formed by the corrugations, means to apply an adhesive to the crowns of the corrugations opposite the applied plain sheet, means to apply a plain sheet of material to the last mentioned adhesive coated crowns, means to direct a current of drying air through the channels defined by both plain sheets, means to apply a fabric to the last mentioned plain sheet, and means to direct a current of drying air into and through said combined elements.

8. In the manufacture of composite corrugated board, means to corrugate a sheet of moistened material, means to direct a current of drying air on to the moist corrugated sheet, means to apply an adhesive to the crowns of the thus dried corrugations, means to apply a plain sheet of material to the adhesive coated crowns, means to direct a current of drying air through the channels formed by the corrugations, means to apply fabric to the plain sheet, means to direct a current of drying air on to the applied fabric, means to apply an adhesive to the crowns of the corrugations opposite the applied sheets, means to apply a plain sheet of material to the last mentioned adhesive coated crowns, means to direct a current of drying air through the channels defined by both plain sheets, means to apply a fabric to the last mentioned plain sheet, and means to direct a current of drying air into and through the thus combined elements.

In testimony whereof we have signed this specification this 16th day of November, 1923.

JOSEPH KRAMER.
ALBERT H. ISRAEL.